(12) United States Patent
Sun et al.

(10) Patent No.: US 7,194,321 B2
(45) Date of Patent: Mar. 20, 2007

(54) MODULAR MULTI-AXIS MOTION CONTROL AND DRIVING SYSTEM AND METHOD THEREOF

(75) Inventors: Dong Sun, Kowloon (HK); Xianyin Shao, Kowloon (HK)

(73) Assignee: Dynacity Technology (HK) Limited, Shatin (HK)

( * ) Notice: Subject to any disclaimer, the term of this patent is extended or adjusted under 35 U.S.C. 154(b) by 169 days.

(21) Appl. No.: 10/975,404

(22) Filed: Oct. 29, 2004

(65) Prior Publication Data

US 2006/0100723 A1    May 11, 2006

(51) Int. Cl.
*G05B 19/18* (2006.01)
*H04L 12/28* (2006.01)
*H02K 21/00* (2006.01)
*G05B 11/01* (2006.01)

(52) U.S. Cl. .................... 700/61; 370/419; 318/254; 318/34; 700/2; 700/20; 700/61

(58) Field of Classification Search ............... 700/61, 700/2, 20; 370/419; 318/254, 34
See application file for complete search history.

(56) References Cited

U.S. PATENT DOCUMENTS

| | | | | |
|---|---|---|---|---|
| 1,988,935 A | * | 1/1935 | Bollaert | 83/552 |
| 4,988,935 A | * | 1/1991 | York | 318/568.18 |
| 5,513,096 A | * | 4/1996 | Casler et al. | 700/20 |
| 5,804,936 A | * | 9/1998 | Brodsky et al. | 318/254 |
| 5,923,132 A | * | 7/1999 | Boyer | 318/34 |
| 5,963,003 A | * | 10/1999 | Boyer | 318/574 |
| 6,121,749 A | * | 9/2000 | Wills et al. | 318/811 |
| 6,300,863 B1 | * | 10/2001 | Cotichini et al. | 340/5.8 |
| 6,845,276 B2 | * | 1/2005 | Bocchi | 700/61 |
| 6,865,441 B2 | * | 3/2005 | Chandhoke | 700/189 |
| 7,024,257 B2 | * | 4/2006 | Pearce et al. | 700/72 |
| 7,064,513 B2 | * | 6/2006 | Fenley | 318/700 |
| 2001/0046237 A1 | * | 11/2001 | Chan et al. | 370/419 |
| 2002/0110155 A1 | * | 8/2002 | Pearce et al. | 370/519 |
| 2003/0009242 A1 | * | 1/2003 | Bocchi | 700/61 |
| 2003/0144751 A1 | * | 7/2003 | Chandhoke et al. | 700/61 |
| 2004/0002778 A1 | * | 1/2004 | Giamona et al. | 700/61 |
| 2005/0001577 A1 | * | 1/2005 | Takahashi | 318/599 |
| 2005/0073279 A1 | * | 4/2005 | Fenley | 318/717 |
| 2005/0140532 A1 | * | 6/2005 | Rubin et al. | 341/141 |

* cited by examiner

*Primary Examiner*—Anthony Knight
*Assistant Examiner*—Sunray Chang
(74) *Attorney, Agent, or Firm*—Lowe Hauptman & Berner

(57) ABSTRACT

A modular multi-axis motion control and driving system includes a control board having a DSP and Flash ROM; a plurality of driver boards connected to the control board though a bus, each board including a FPGA device and a plurality of MOSFET power amplifiers; a computer, connected to the control board provides a graphic user interface through which motor setting, current and position control loop tuning and diagnostic may be performed. A DSP program, system parameters and FPGA configuration file are stored in the Flash ROM. At startup the DSP automatically executes loader firmware transferring the DSP program from the Flash ROM to the DSP. The DSP reads the FPGA configuration file and configures the FPGA in each driver board simultaneously. The control program then loops to perform system diagnose, network service and check command queue, while the current and position controls are implemented in an interrupt service.

8 Claims, 9 Drawing Sheets

MODULAR MULTI-AXIS MOTION CONTROL AND DRIVING SYSTEM AND METHOD THEREOF

TECHNICAL FIELD

This invention relates to the digital control and power electronic technologies. More specifically, to a universal multi-axis digitized motion control & driving system and the method thereof that can be used in many different applications.

BACKGROUND OF THE INVENTION

As a core technology in modern manufacturing, advanced motion control systems have received considerable attention in the past decades. Motion control is a fundamental concern in many industrial applications. For example, putting an object in the correct place with the right amount of force at the right time is essential for efficient manufacturing operations. High speed and high accuracy positioning systems are essential elements in advanced manufacturing systems such as semiconductor industry (e.g. Surface Mounting Technology-SMT). The demands for higher productivity and quality call for the development of high performance positioning devices. Motion control is widely used in modern manufacturing and becomes one of the technological foundations of industrial automation. At present time, more and more manufacturing companies are looking forward to applying multi-axis motion control architecture in their machinery designs and production lines. This is not only for rapid production, but also for accuracy requirement in so many missions in which multi-axis motions must be performed synchronously.

System design plays a critical role in overall performance of the motion control system. Since the sampling frequency of the motor control loop is usually considered as an important criterion for evaluating a good motion control system, the use of high-frequency motion control and driving systems is becoming the trend. The low frequency characteristic degrades the performance significantly, even though an advanced control algorithm is used. On the other hand, traditionally, the motion control card is inserted inside a PC so that the CPU of the computer can be utilized. Such architecture is not ideal to industrial environments. Applying a distributed architecture in motion control design, in which the control system is separated physically from the computer and does not rely on the computer's CPU, is an ideal solution to improve overall performance (including increment of sampling frequency). Employing a distributed motion control system is becoming hot in recent years. With a distributed architecture, the control system employs its own CPU by Digital Signal Processor (DSP) technology, and runs in high speed. Through RS232/RS485 communication, the distributed control system can be connected with the computer for various interface operations.

Another possible solution to improve overall system performance is to integrate motion control and driving system together, since a good motion system must be able to handle control and driving simultaneously. An integrated design of outer position loop and inner current loop with digital technologies will help optimize the overall design, and more importantly, allow the use of high-speed communication buses.

Therefore, there is a need to provide a new control and driving system that makes it possible to design high-frequency control loops and the dimension of the system is reduced to a great extent.

BRIEF SUMMARY OF THE INVENTION

The first object of this invention is to provide a novel multi-axis motion control and driving system capable of realizing the distributed architecture.

The second object of this invention is to provide a novel multi-axis motion control and driving system capable of integrating high performance motion control and servo amplifier together, which makes it possible to design high-frequency control loops and the dimension of the system is reduced to a great extent.

To achieve above object of this invention, a modular multi-axis motion control and driving system is provided, which comprise: a control board comprising a DSP and Flash ROM connected to each other, for performing position control and current control of said system; a plurality of driver boards, connected to the control board though a bus, each of which comprise a FPGA device and a plurality of MOSFET power amplifier, for driving a plurality of servo motors; a computer, connected to said control board, for providing graphic user interface, through which motor setting, current and position loop tuning and diagnostic can be performed. Wherein, a control program, system parameters and FPGA configuration file are stored in said Flash ROM, when the system power is on, the DSP automatically executes an loader firmware to transfer the control program from said Flash ROM to the memory of DSP for execution, then the DSP reads the FPGA configuration file from the Flash ROM and configure the FPGA in the driver board, after that, the control program runs into a circulation loop to do system diagnose, network service and check command queue, while the current and position controls are implemented in an interrupt service.

Preferably, said control board further comprising a RS232 and RS485 connector through which said computer connects to said control board through said RS232 and RS 485 connector, a decoder acting as chip selector of the system, a watch dog for monitoring the status of the control system and a DC-DC subsystem for converting power supply.

Preferably, said FPGA device implements PWM generator, decoder/hall logic circuit, digital I/O, counter circuit and some other glue logics.

Preferably, said driver board further comprising a I/O connector for providing digital I/O, analog input, differential I/O connection for the motion control system, a differential receiver/transmitter through which the differential I/O signal is connected to the FPGA device, an A/D converter for converting the analog input to digital signal, a connect port provided for connecting to external brake coils.

Preferably, said MOSFET power amplifier of the driver board further comprising a 3-phase bridge driver, a inverter connected to and droved by the 3-phase bridge driver for provides power for said servo motors.

Preferably, said I/O connector constituting the input/output ports of 4 differential outputs, 2 differential inputs, 2 Opto isolated inputs, 4 Opto isolated outputs and 2 individual analog input with 12 bit true differential resolution.

Preferably, said driver board further comprising current-sensing resistors for current sensing in a motor's electronic power stage, said current-sensing resistors are in series with the ground return of the inverter, the analog signals from the sensing resistors are converted to digital signals by said A/D converter, and then are sent to the DSP of the control board via said bus.

The other aspect of this invention provides a control and driving method of above-mentioned system, comprising the steps of: turn on the system; system boot up; control program are run into a circulation loop to do system diagnose, network service and check command queue; If current and position controls interrupt occurs, the procedure skips to an interrupt service in order to ensure real time controls of the current loop and position loop.

Preferably, the step of system booting up further comprises following steps: Load DSP program from Flash ROM into the DSP of the control board; Read FPGA configuration files from Flash ROM and configure the FPGA of the driver board in accordance with the contents of the FPGA configuration file; Test the number of driver boards; Initialize the network service; Initialize system parameters and identify motor type.

Preferably, the interrupt service further comprises following steps: Read feedback encoder signal; Read current sensing signal; Performing current loop control; Circulating counter; Performing position loop control and trajectory generation according to the value of the counter.

The advantageous features of this invetion are as follows:
1) Modular Structure: The new developed motion control and driving system integrates high performance motion control and servo amplifier together. The system employing a modular architecture in which the number of driver boads can be adjusted based on users' request for the number of axes. The maximum number of motor axes is 6.
2) Hardware Features: The modular multi-axis motion control and driving system is developed by using advanced Digital Signal Processor (DSP) and Field Programmable Gate Array (FPGA) technologies. The new developed motion control and driving system can drive several different kinds of motors, such as DC brushless, DC brushed or AC servo motor. Two digital control loops, namely outer position loop and inner current loop, are designed with frequencies of 4 kHz and 20 kHz, respectively. The output power range for each axis is about 12 A×85V (the voltage can be higher).
3) Communication: Both RS232 and RS485 communications are provided by this system. The RS485 communication provides more powerful communication speed and communication length.
4) Input/Output Port: Each driver board provides a input/output ports which has 2 channels individual ±10V analog input with 12 bit true differential resolution, 4 channels differential & 2 opto isolated inputs, 4 channels opto isolated outputs, 4 channels differential outputs.
5) Software: User friendly interface for controller and motor setting, current and position loop tuning, and diagnostics. DLL library enable users to develop various application software.

The developed products have the following three unique advantages compared to all other commercial products in the world today: 1) Employing high integration module by integrating motion control and power amplifier into one unit to achieve space saving, reduced wiring complexity, and faster development cycles; 2) Employing fully-digitalized control and driving technology and providing two digital control loops for outer position loop control and inner current loop control; 3) Applicable to many types of servomotors, such as i.e. DC motors, DC brushless motors, AC servomotors etc. Also, the EMC problem and the performance of the system are improved; 4) It employs a modular architecture in which the number of driver boads can be adjusted easyily based on users' request for the number of axes.

The new developed system integrates high performance motion control and servo amplifier together, which makes it possible to design a high-frequency system. This approach not only saves space and cost, but also improves reliability because wiring is reduced and external components are eliminated. Two digital control loops, namely outer position loop and inner current loop, are designed with frequencies of 4 kHz and 20 kHz, respectively. This implies that all control actions of up to 6 axes can be completed within 250 µs in the position loop. The sampling frequency of the current loop will be 20 k Hz.

These and other objects, features and advantages of the present invention will become more apparent from the detail explanation of the invention explained below, referring to the attached drawings.

DETAILED DESCRIPTION OF THE INVENTION

Figure 1:
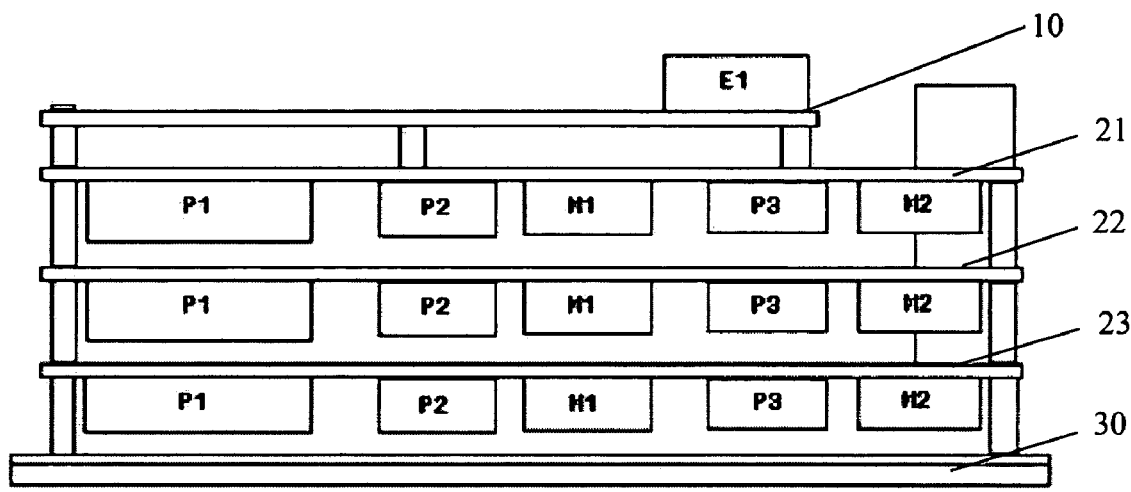
FIG. 1 is front view of the modular multi-axis motion control & driving system according to the embodiment of the present invention.

FIG. 1 is front view of the modular multi-axis motion control & driving system according to the embodiment of the present invention. As illustrated in FIG. 1, the toppest layer is a control board (a four layer PCB) 10, others layers are driver board 21, 22 and 23 (a six layer PCB), the bottom layer is a heat sink board 30. The dimension of the entire system is 170×100×75.

The modular multi-axis motion control and driving system of the embodiments of this invention consists of one control board 10 and several driver boards 21, 22 and 23. The number of driver boards is one to three. Each driver board can drive two motors (DC brushless, DC brushed or AC servo motor). The multi-axis motion control system can be implemented by using one control board and several driver boards. Therefore, a 4-axis system can be established using one control board and two driver boards, and a 6-axis system can be established using one control board and three driver boards.

Figure 2:
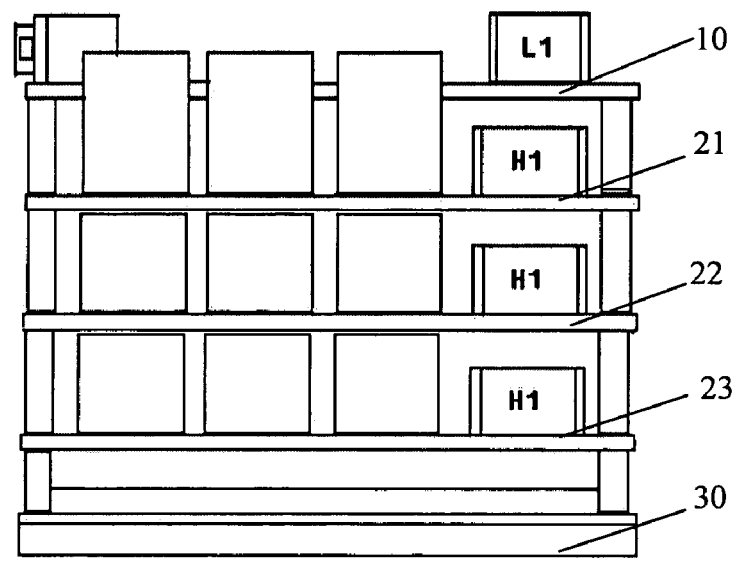
FIG. 2 is right side view of modular multi-axis motion control & driving system according to the embodiment of the present invention.

The embodiment of FIG. 1 illustrates the modular multi-axis motion control and driving system capable of driving 6-axis. FIG. 2 illustrates its right side view. The interface of the modular system is shown in the table 1, which shows a detailed introduction of the interface of the system.

TABLE 1

Modular multi-axis motion control and driving system interface description

| No. | Interface | Description |
| --- | --- | --- |
| 1 | L1 | Low voltage power supply connector |
| 2 | H1 | High voltage power supply connector |
| 3 | M1, M2 | Three phases power connect to motor connector |
| 4 | P1 | Input/output connector |
| 5 | P2 | Axis-1 encoder and hall signal input interface |
| 6 | P3 | Axis-2 encoder and hall signal input interface |
| 7 | E1 | RS232/RS485 communication interface |

As shown in these two Figures, the toppest layer is a control board (a four layer PCB) 10, others layers are driver board 21, 22 and 23 (a six layer PCB), the bottom layer is a heatsink board 30. The dimention of the entire system is 170×100×75.

The consturction and principle of the contral board and the driving board are discribed in detail as follows.

Figure 3:
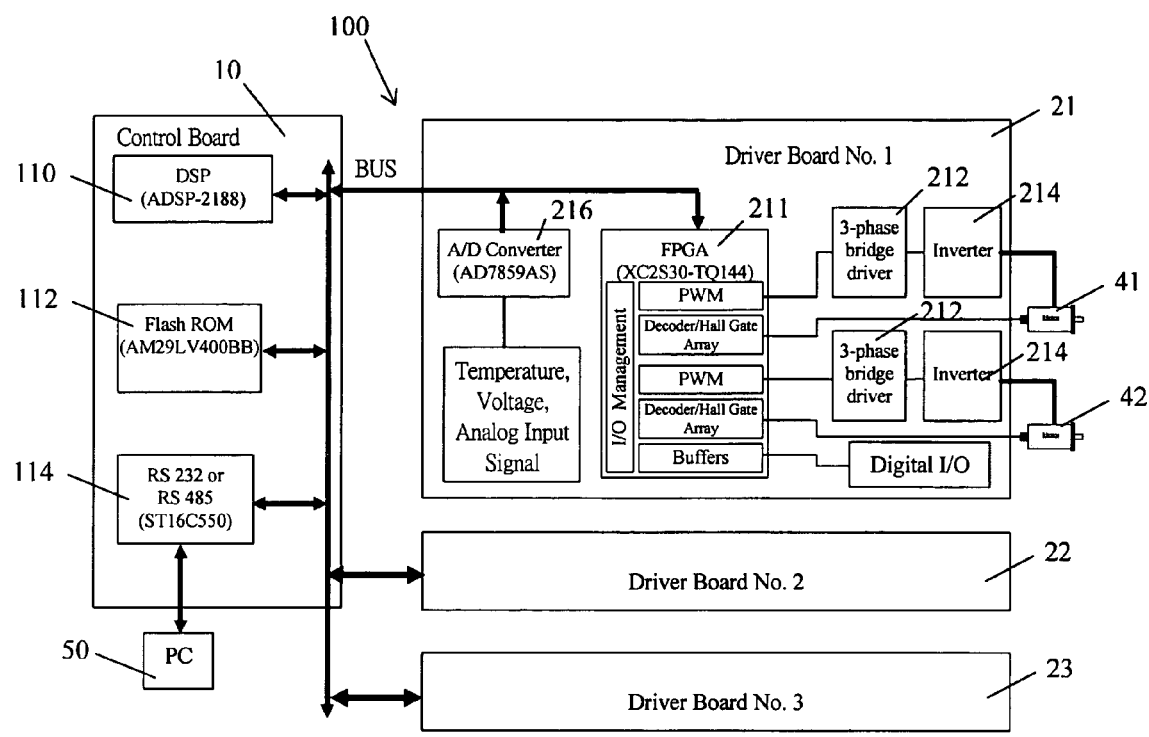
FIG. 3 is system diagram of the modular multi-axis motion control & driving system according to the embodiment of the present invention.

FIG. 3 illustrates the system arragement diagram of the embodiment of this invention, As we can see from FIG. 3, the system 100 of this embodiment comprises a control board 10, three driver board 21, 22 and 23 which connected with the control board 10 via bus, a PC 50 connected to the control board for providing graphic user interface, through which motor setting, current and position loop tuning and diagnostic can be performed. The control board mainly comprises a DSP 110 for executing control algorithm, a Flash ROM 112 for storing the system parameters, control program and FPGA configuration file, and a RS232 or RS485 port 114 for communication with the PC 50. The driver board mainly comprises a FPGA device for implementing the function of PWM generation, decoder/hall logic circuit, digital I/O, counter etc, 3-phase bridge driver 212 and inverter 214 for generating the driving signal to the servomotor 41, 42, an A/D converter 216 for converting the temperature, voltage, analog input signal into digital signal.

Control Board

Figure 4:
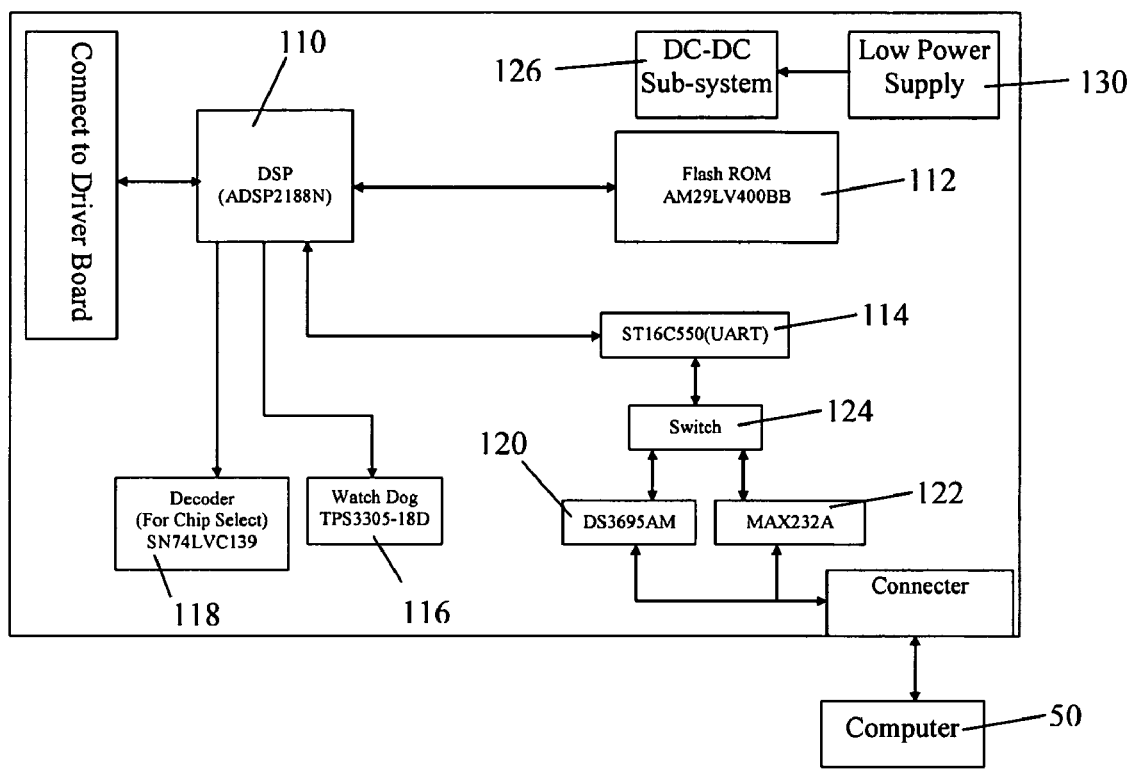
FIG. 4 is system diagram of control board according to the embodiment of the present invention.

FIG. 4 illustrates the detailed functional block diagram of the control board. DSP 110 on the control board 10 performs motion command processing, trajectory generation, position control and current control. The Flash ROM 112 of the control board is non-volatile FLASH program memory to store user programs and performance parameters.

The control board employs a four-layer PCB design. The main components in the control board are: DSP 110 (ADSP2188N), Flash ROM 112 (AM29LV400BB), RS232 or RS 485 114 (ST16C550), watch dog 116 (TPS3305-18D), decoder 118 (SN74LVC139), DS3695AM 120, MAX232A 122. The DS3695AM 120, MAX232A 122 are connected to swith 124, and the swith 124 is connected to the RS 232 or RW 485 114.

The control board has the following main functions:
The high performance DSP ADSP2188N acts as the heart of the motion control and driving system. All control loop and communication algorithms are runing in this DSP. When the system power is on, DSP loads program from Flash ROM and configures the FPGA in the driver board.

The system DSP program, system parameter and FPGA configuration file are stored in the Flash ROM AM29LV400BB.

Both RS232 and RS485 communications are provided by this system. The RS485 communication provides more powerful communication speed and communication length. The ST16C550 114 acts as a universal asynchronous receiver and transmitter. DS3695AM is for RS485 communication and MAX232A is for RS232 communication. The swith 124 can swith the signal channel between the DS3695AM and MAX232A.

The decoder SN74LVC139 acts as chip selecter of the system.

The function of the watch dog TPS3305-18D is to monitor the status of the control system.

The DC-DC subsystem 126 connected to the low power supply 130 provides voltage conversion from 24V to 12V, 24V to 5V, 5V to 1.8V and 5V to 2.5V.

Driver Board

Figure 5:
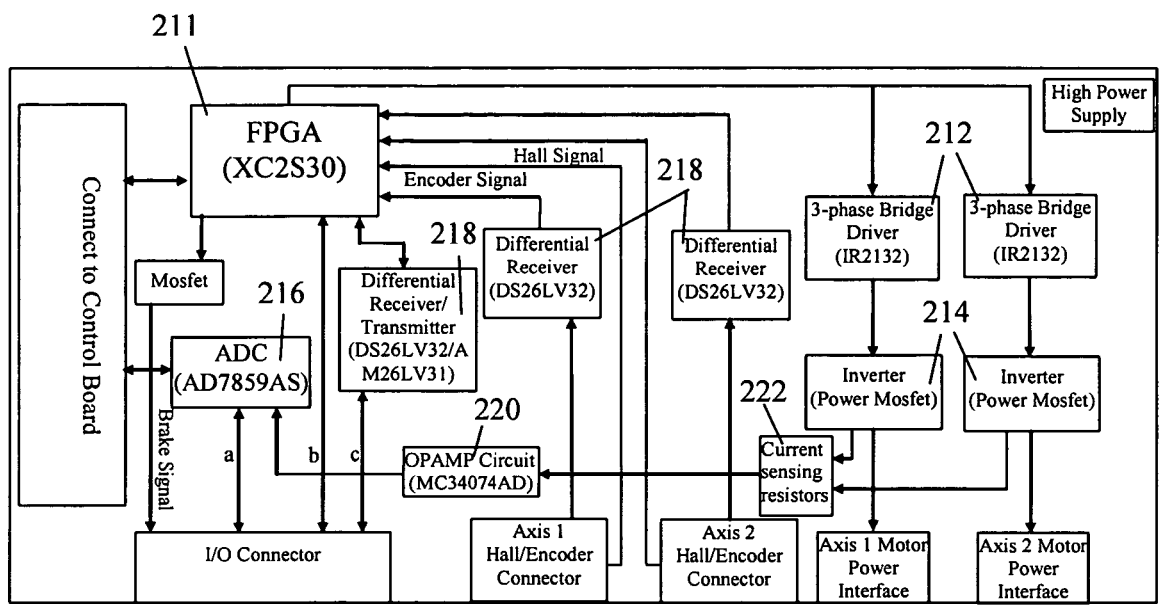
FIG. 5 is system diagram of driver board according to the embodiment of the present invention.

FIG. 5 illustrates the detailed functional block diagram of the driver board. The driver board includes a FPGA 211 and high efficiency MOSFET power amplifiers (3-phase bridge driver) 212. It also includes commutation control circuity (Inverter) 214 for hall-commutated brushless motors. These modules are fully digitized. I/O signal conditioning is included for digital and analog inputs and outputs.

The driver board 21 employs a six-layer PCB design. The main components in the driver board are: FPGA 211 (XC2S30), A/D converter 216 (AD7859AS), differential receiver 218 (DS26LV32), differential transmitter 218 (AM26LV31), OPAMP circuit 220 (MC34074AD), 3-phase Bridge Driver 212 (IR2132), Inverter (Power Mosfet) 214, Current Sensing Resistor 222.

The driver board has the following main functions:
PWM generator, decoder/hall logic circuit, digital I/O, counter and some other logic circuits are implemented in FPGA 211 with the model No. XC2S30.

The I/O connector provides digital I/O, analog input, differential I/O connection. As illustrated in FIG. 5, line a denotes 2 channels individual ±10V analog input with 12 bit resolution; line b denotes 2 channels Opto isolated inputs and 4 channels Opto isolated outputs; and line c denotes 2 channels differential inputs and 4 channels differential outputs. The digital Input/Output signal is connected directly to FPGA. The differential Input/Output signal is connected to FPGA through differential receiver/transmitter 218 (DS26LV32/AM26LV31). The analog input is connected to A/D converter 216 (AD7859AS) for analog to digital conversion. Then the status of the input port are stored in the DSP registers and the output ports are controlled by DSP.

The hall interfaces are connected directly to FPGA. The status of the hall sensor is stored in FPGA registers. The encoder signal is connected to FPGA through differential receiver 218. Through the process of encoder logic circuit, rotate direction and encoder counts of motor will be obtained and stored in FPGA registers.

The temperature of power devices, feedback voltage of the motor phases, current of the inverter and the analog input signal will be converted to digital signals by A/D converter (AD7859AS) 216.

A connect port is provided in the I/O connector for connecting to external brake coils up to 250 mA. A total of two brake drivers are available (one per axis) on each driver board.

The inverter 214 drived by a 3-phase bridge driver (IR2132) 212 provides power for 3-phase motors.

In the modular motion control system, the approach to current sensing in a motor's electronic power stage is to use a current-sensing resistor 222. The current sensing feedback voltage is derived from two parallel 0.05 ohm low-inductance surface mount sense resistors that are in series with the ground return of the inverter 214. The voltage across these resistors is amplified by the amplify circuit 220 (MC34074AD). Then, the A/D converter 216 will convert the analog signal to digital signal. DSP of the control board will read the data from the register if the A/D converter completes the A/D conversion.

Input/Output Port

Every driver board has an input/output connector. The input/output ports in every driver board are listed as following.

- 4 differential outputs,
- 2 differential inputs,
- 2 Opto isolated inputs,
- 4 Opto isolated outputs,
- 2 individual ±10V analog input with 12 bit true differential resolution,
- Also an additional I/O extension board with more inputs/outputs is provided.

The number of I/O ports of a four-axis (six-axis) system is two (three) times of the two-axis system. The input and output configuration can be reference to FIG. 5. The input and output ports can be used as upper and lower limit switch signal input port or used to control some related equipments and some other usages.

Figure 6:
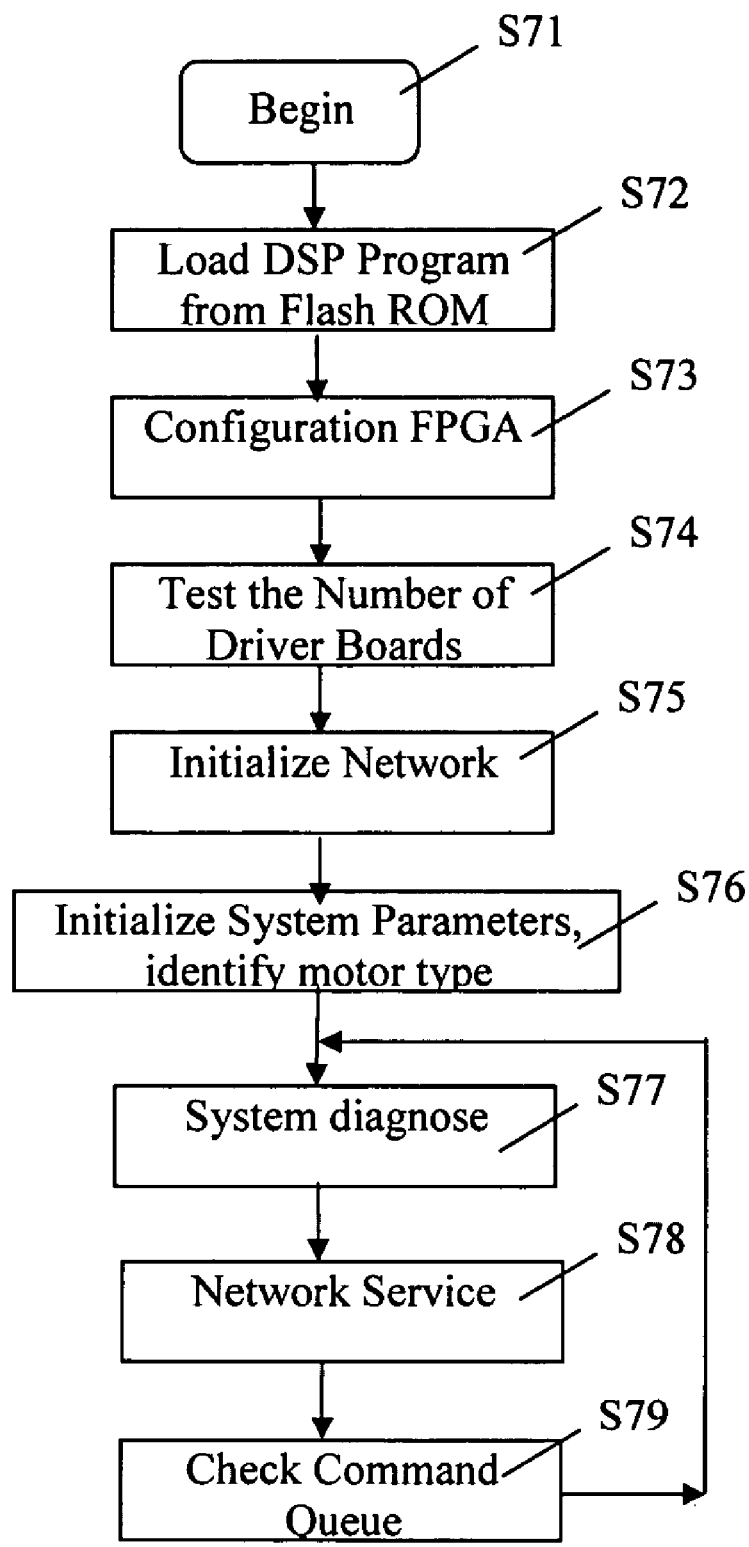
FIG. 6 is flow chart of the DSP program according to the embodiment of the present invention.

The control method of the system of this invention is described with reference to the FIG. 6 and FIG. 7 as follows.

The DSP software is written in C language and Analog Devices assembly language for doing the real time motion control functionality, which is run in the DSP in the control board. When system power is on (S71), the DSP automatically executes loader firmware to transfer the program from Flash memory to high-speed static RAM for execution (S72). Then the DSP will read FPGA configuration file from Flash ROM and configure the FPGA in driver board (S73). After the configuration of the FPGA, DSP will get to know how many axes in the system, that is test the number of driver boards (S74). After that, the network service will be initialized and the system parameters will load into the DSP memory (S75). According to the parameter, system will get to know the motor type of the current connection (S76).

After the system boots up, the control program runs into a circulation loop to do system diagnose (S77), network service (S78), check command queue (S79). Both current and position controls are implemented in an interrupt service in order to ensure real time controls of the current loop and position loop. The outer position loop uses observer-based state variable control with velocity feedback. The result exhibits very high dynamic stiffness and a reduction of tracking errors, even in systems with a large inertial mismatch between motor and load. The position loop provides better performance by controlling two state variables, namely position and velocity. Since there is no direct measurement of velocity, velocity feedback is provided by a velocity observer. The output of the position loop is current set-point given by equation (1). The inner current loop employs a digital compensator, which is tunable for a selection of various motors. The output of the inner current loop is PWM waveform duty cycle give by equation (2). The basic structure of the control loop compensator for one axis is illustrated in FIG. 10.

$$I_{set}(k) = K_p \cdot P_{error}(k) + K_i \cdot \sum_{j=0}^{k} P_{error}(i) + \quad (1)$$
$$K_d \cdot [P_{error}(k) - P_{error}(k-1)] + B_p \cdot V_{error} + K_{vff} \cdot V_{set} + K_{aff} \cdot A_{set}$$

$$PWM_{dutycycle} = IK_p \cdot I_{error} + IK_i \cdot \sum_{i=0}^{k} I_{error}(i) \quad (2)$$

Figure 10:
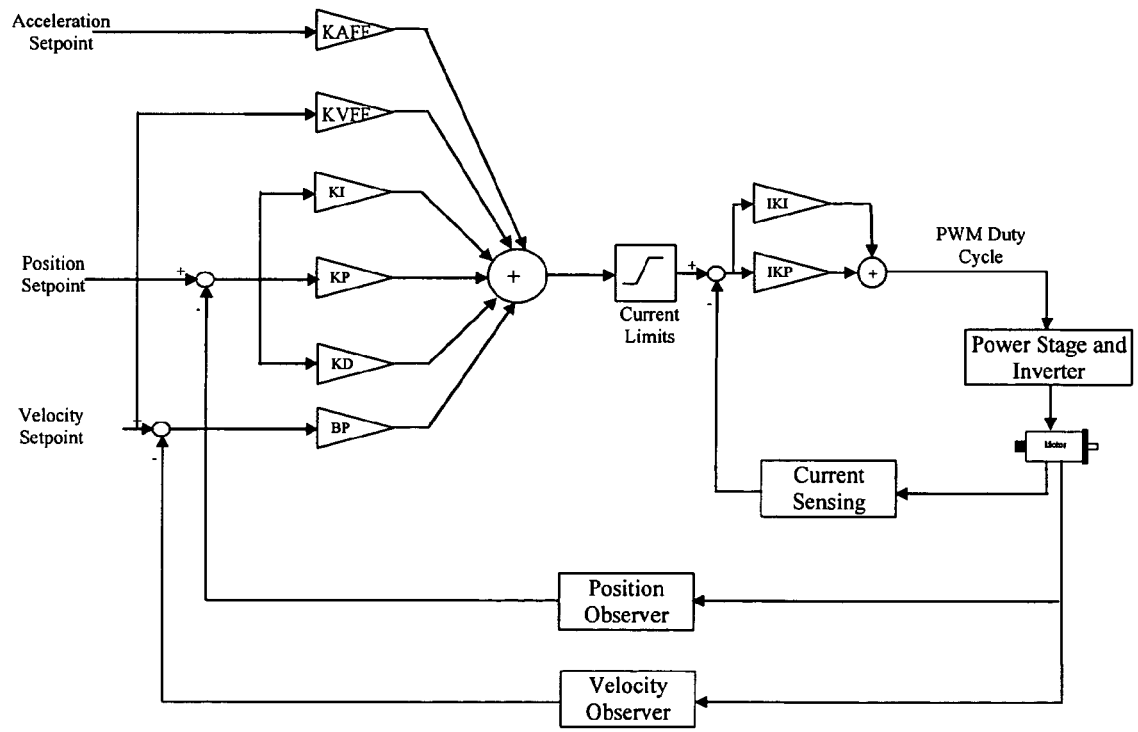
FIG. 10 is the control algorithm block diagram.
Figure 11:
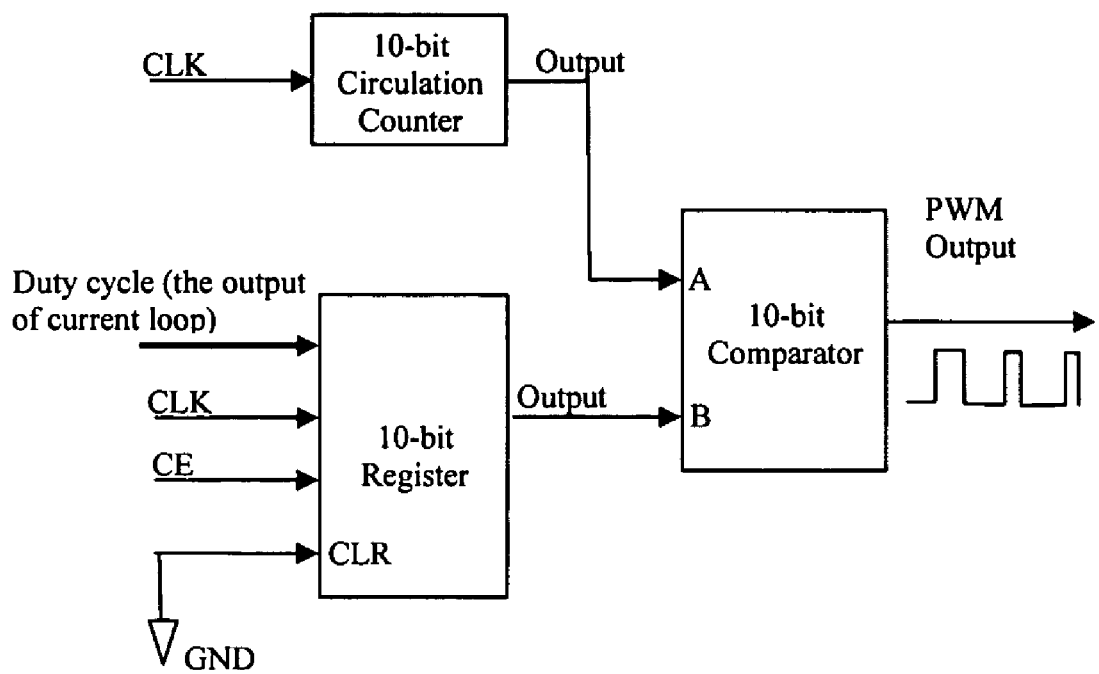
FIG. 11 is diagram of the PWM generator.

The meanings of the parameters in FIG. 10 and equation (1), equation (2) are as following:

$K_p$—Position error proportional gain
$K_i$—Position error integral gain
$K_d$—Position error derivative gain
$B_p$—Velocity error gain
$K_{vff}$—Velocity feed forward gain
$K_{aff}$—Acceleration feed forward gain
$IK_i$—Current error integral gain
$IK_p$—Current error proportional gain
$P_{error}$—Position error
$V_{error}$—Velocity error
$A_{error}$—Acceration error
$V_{set}$—Velocity setpoint
$A_{set}$—Acceration setpoint The output of the inner current loop is PWM waveform duty cycle which will used to control on and off of the power mosfet of the inverter 214 through 3-phase bridge driver 211, and eventually, control the rotate of the motor. The PWM generator used in the modular multi-axis motion control and driving system is a fully digital PWM generator. The circuit of PWM generator is very simple compared to traditional sinasoidal PWM generator. It only contains a 10-bit counter, a 10-bit register and a 10-bit comparator. The diagram of the digital PWM generator is shown as FIG. 11. In FIG. 11, when A<B, output of the comparator is 'high'.

Figure 12:
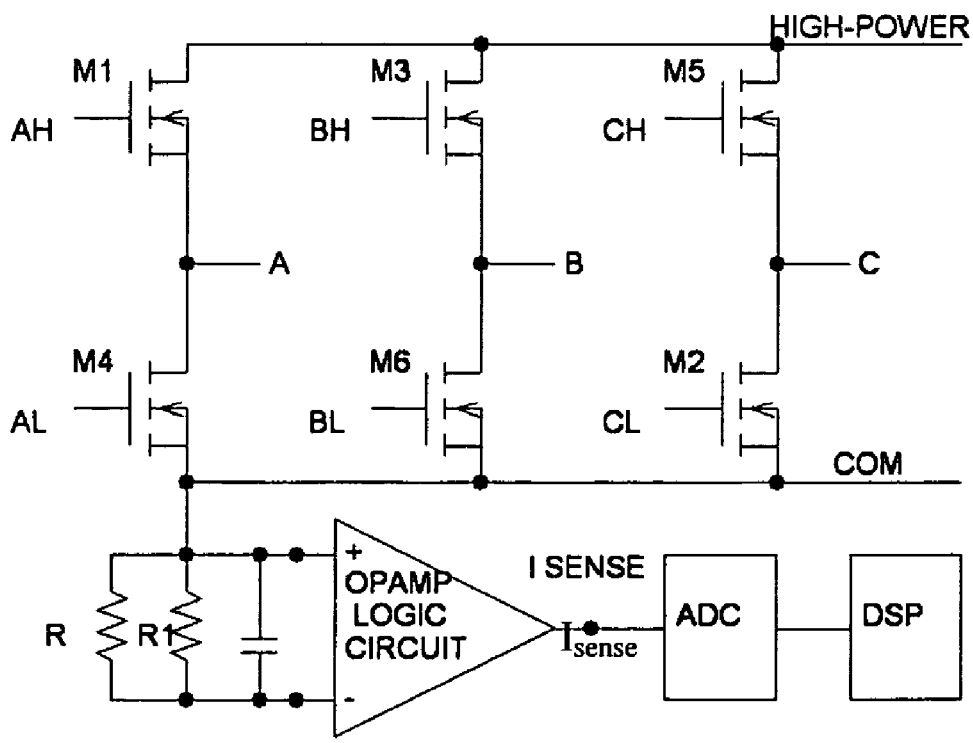
FIG. 12 is diagram of current sensing circuit.

In the modular motion control system, the approach to current sensing in a motor's electronic power stage is to use two current-sensing resistors, as shown in FIG. 12.

In FIG. 12, AH, AL, BH, BL, CH and CL denote the power MOSFET gate driver. A, B and C are three phases output to motor. R and R1 are two 0.05 ohm current-sensing resistors. The current-sensing resistor should be non-inductive low-resistance resistor. Standard wirewound or thick carbon restores are seldom suitable for use as a current-sensing resistor. The wirewound resistor exhibits too much internal iductance and will generate ringing in a PWM type motor control circuit. Standard carbon resistors are rarely available in low resistance values and may not be rated to handle high current peaks. $I_{sense}$ is a current sense feedback voltage. It is derived from two parallel 0.05 ohm low-inductance surface mount sense resistors that are in series with the ground return of the inverter. The voltage across these resistors is amplified by the amplify circuit. Then, the A/D converter will convert the analog signal to digital signal. DSP will read the data form the register if the A/D converter when A/D conversion is complete.

Figure 9:
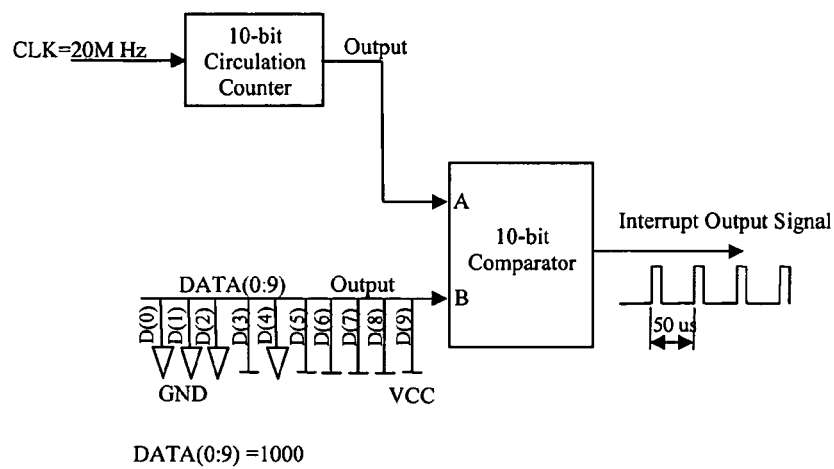
FIG. 9 is diagram of interrupt generator.

In the modular multi-axis motion control system, current loop and position loop are executed in the form of interruption. The interrupt generator is implemented in FPGA as FIG. 9. The interrupt frequency can be obtained from FIG. 9 as following equation.

$$InerruptFrequency = 20 \times 10^6 \times \frac{1}{1000} = 20 \times 10^3 \text{ Hz} \qquad (3)$$

Figure 7:
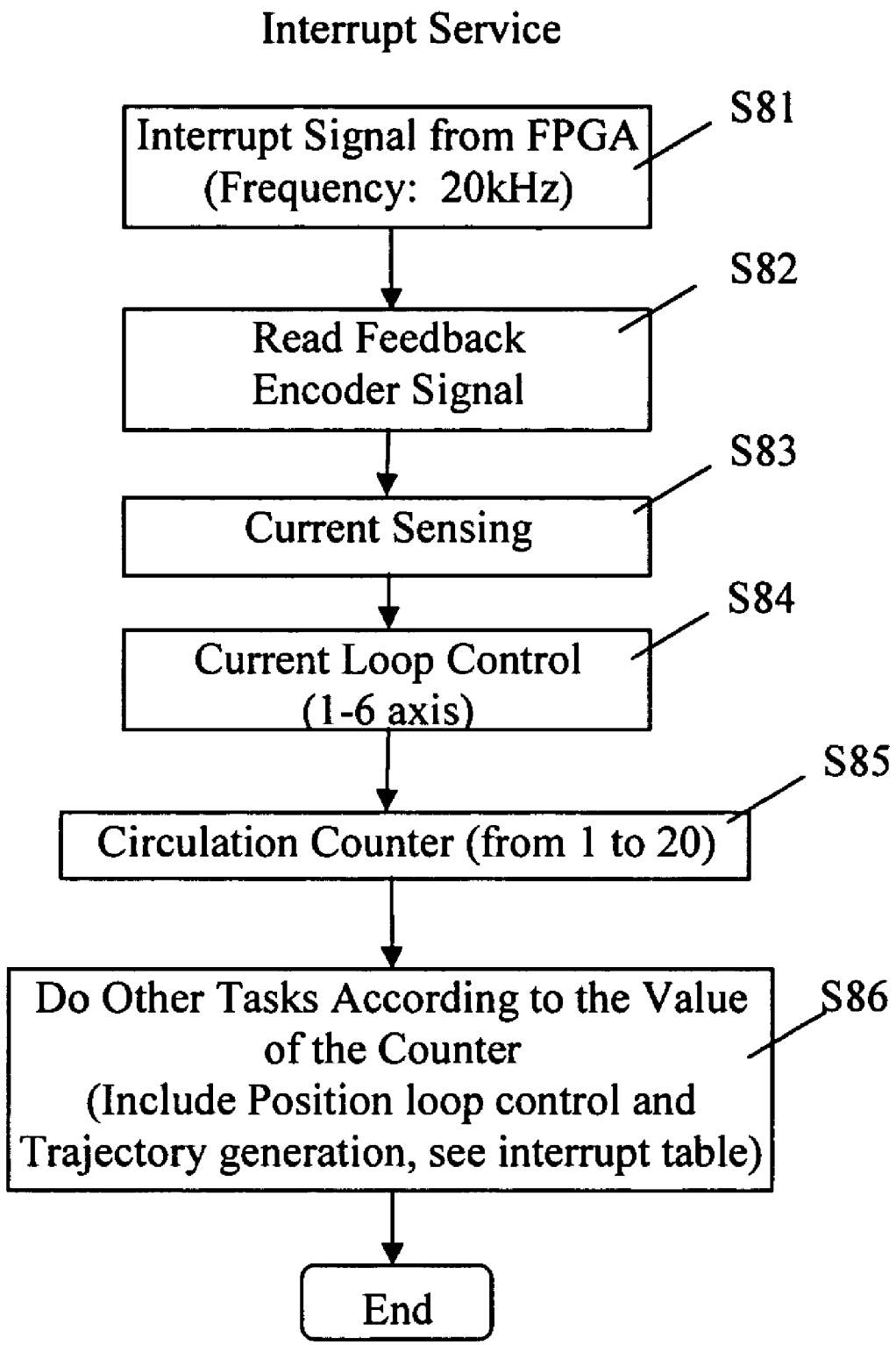
FIG. 7 is flow chart of the interrupt service of the DSP program according to the embodiment of the present invention.

Interrupt structure of the modular multi-axis motion system is shown in FIG. 7. It can be obtained that the frequency of current loop and position is 20 kHz and 4 kHz respectively.

Once an interrupt occurs (S81), the interrupt service will be performed. First, the encoder feedback will be read from the register in FPGA (S82), then performing current sensing (S83) and current loop control of 1~6 axis (S84). After that, other tasks such as position loop control and trajectory generation will be performed according to the value of the circulation counter (S85). The detailed description of the tasks is listed in Table 2.

TABLE 2

Interrupt Table

| Value of Counter | Tasks description |
|---|---|
| 2, 7, 12, 17 | 1, 4 axis position loop control |
| 4, 9, 14, 19 | 2, 3 axis position loop control |
| 1, 6, 11, 16 | 3, 6 axis position loop control |
| 3 | 1, 4 axis trajectory generation |
| 5 | 2, 5 axis trajectory generation |
| 8 | 3, 6 axis trajectory generation |
| 10 | Digital I/O sampling |
| 13 | Diagnostics |
| 15 | A/D converter |
| 18 | Average current calculation |
| 20 | LED status |

Figure 8:
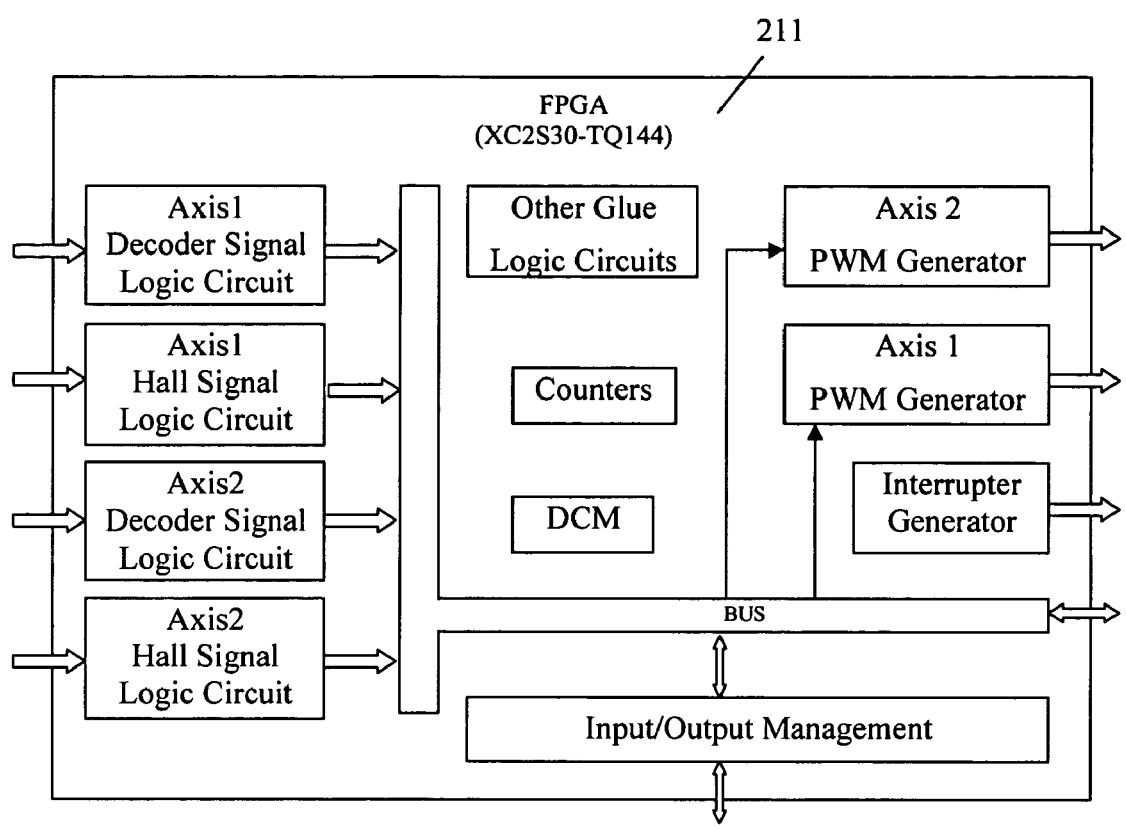
FIG. 8 is diagram of FPGA configuration.

XC2S30 provided by Xilinx is selected as the FPGA to implement the modular multi-axis motion control system. PWM generator, decoder/hall logic circuit, digatal I/O, counter and some other logic circuits are implemented in FPGA. FIG. 8 illustrates the diagram of FPGA configuration.

In addition to the DSP program, a user friendly interface is also developed, which is used for controller and motor setting, current and position loop tuning, diagnostics and simple task programming. For users' convience, a DLL library is developed for users to develop various application softwares.

As a core technology in modem manufacturing, advanced motion control systems have received considerable attention in the past decades. The modular multi-axis motion control and driving system of present invention can be used in many industrial applications, such as in SMT and precision machines, CNC carving machine, DNA testing system and mobile robot.

What is claimed is:

1. A modular multi-axis motion control and driving system comprising:
   a control board comprising a DSP and Flash ROM connected to each other, for performing position control, velocity control and current control of said system;
   a plurality of driver boards, connected to the control board though a bus, each of which comprise an FPGA device and a plurality of MOSFET power amplifiers for driving a plurality of servo motors;
   a host computer, connected to said control board, the host computer configured to provide a graphic user interface, through which motor setting, current and position loop tuning and diagnostic can be performed;
   wherein, a DSP control program, system parameters and an FPGA configuration file are stored in said Flash ROM;
   wherein the DSP is configured to automatically execute loader firmware to transfer the control program from said Flash ROM to a memory of the DSP for execution;
   wherein the DSP is further configured to read the FPGA configuration file from the Flash ROM and configure each FPGA in the plurality of driver boards simultaneously;
   wherein the control program is configured to run in a circulation loop performing system diagnose, network service and check command queue, while the current and position controls are implemented in an interrupt service routine; and
   wherein each driver board further comprises a I/O connector for providing digital I/O, analog input, differential I/O connection for the FPGA device, a differential receiver/transmitter through which the differential I/O signal is connected to the FPGA device, an A/D converter for converting the analog input to digital signal, a connect port provided for connecting to external brake coils; and
   wherein each of said plurality of I/O connectors comprises an input/output port including 4 differential outputs, 2 differential inputs, 2 optically-isolated inputs, 4 optically-isolated outputs and 2 individual analog inputs with 12 bit true differential resolution.

2. A system as claimed in claim 1, wherein said control board further comprises at least one of a RS232 and a RS485 connector configured to connect, via operation of a switch, said computer to said control board.

3. A system as claimed in claim 2:
   wherein an RS232 interface protocol provides node to node communication between the controller and the host computer;
   wherein an RS485 interface protocol provides multi-node communication; and
   wherein the system is configured to allow up to 32 controllers to be connected to the RS485 network and communicate between each other and!or the host computer.

4. A system as claimed in claim 1, wherein said FPGA device implements PWM generator, decoder/hall logic circuit, digital I/O, counters and some other glue logics.

5. A system as claimed in claimed in claim 1, wherein each of said plurality of MOSFET power amplifiers further comprises a 3-phase bridge driver, a inverter connected to and droved by the 3-phase bridge driver for provides power for said servo motors.

6. A system as claimed in claim 5, wherein said driver board further comprising current-sensing resistors for current sensing in a motor's electronic power stage, said current-sensing resistors are in series with the ground return of the inverter, the analog signals from the sensing resistors are converted to digital signals by said A/D converter, and then are sent to the DSP of the control board via said bus.

7. A system as claimed in claim 1:
   wherein the plurality of driver boards comprises 1–3 driver boards;
   wherein each driver board is configurable, based upon a user's requirement, to drive a plurality of servo motors; and
   wherein said system uses 2, 4, or 6 axes.

8. A system as claimed in claim 1, wherein each of said plurality of driver boards connects 2 servo motors of a type selected from a type of motors consisting of DC brushless motors, DC brushed motors, and AC servo motors, the graphic user interface operable to select the type of motor.

* * * * *